(12) United States Patent
Holzapfel et al.

(10) Patent No.: US 7,046,368 B2
(45) Date of Patent: May 16, 2006

(54) POSITION MEASURING ARRANGEMENT

(75) Inventors: Wolfgang Holzapfel, Obing (DE); Udo Linnemann, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 383 days.

(21) Appl. No.: 10/632,536

(22) Filed: Aug. 1, 2003

(65) Prior Publication Data

US 2004/0090636 A1 May 13, 2004

(30) Foreign Application Priority Data

Aug. 3, 2002 (DE) ................................ 102 35 669

(51) Int. Cl.
*G01B 9/02* (2006.01)
*G01B 11/14* (2006.01)

(52) U.S. Cl. ...................... 356/488; 356/499; 356/485; 356/616; 250/237 G

(58) Field of Classification Search ................ 356/488, 356/494, 499, 521, 616–622, 486, 493, 498; 250/237 G; 372/32
See application file for complete search history.

(56) References Cited

U.S. PATENT DOCUMENTS 5,000,542 A * 3/1991 Nishimura et al. ..... 250/237 G
5,161,165 A * 11/1992 Zorabedian .................. 372/20
5,198,873 A * 3/1993 Ishizuka et al. ............ 356/494
6,473,184 B1 * 10/2002 Ishizuka et al. ............ 356/499

FOREIGN PATENT DOCUMENTS

WO    WO 02/23131 A1    3/2002

OTHER PUBLICATIONS

U.S. Appl. No. 10/380,847, filed Sep. 24, 2003, Holzapfel et al.

* cited by examiner

*Primary Examiner*—Gregory J. Toatley, Jr.
*Assistant Examiner*—Patrick J. Connolly
(74) *Attorney, Agent, or Firm*—Brinks Hofer Gilson & Lione

(57) ABSTRACT

A position measuring arrangement for determining a relative position between a first object and a second object. The arrangement includes a light source having a single-mode laser light source that generates radiation and a signal generator that receives the radiation and generates displacement-dependent output signals that determine a relative position between a first object and a second object. A feedback device, wherein the laser light source interacts with the feedback device in such a way that an excitation of several modes takes place in the single-mode laser light source, and a multi-mode operation of the single-mode laser light source results.

17 Claims, 6 Drawing Sheets

POSITION MEASURING ARRANGEMENT

Applicants claim, under 35 U.S.C. § 119, the benefit of priority of the filing date of Aug. 3, 2002 of a German patent application, copy attached, Serial Number 102 35 669.6, filed on the aforementioned date, the entire contents of which is incorporated herein by reference.

BACKGROUND OF THE INVENTION

1. Field of the Invention

The present invention relates to a position measuring arrangement for determining the relative position between two objects, including a light source and a signal generator that generates displacement-dependent output signals.

2. Discussion of Related Art

For highly precise position measurements, position measuring arrangements on an optical basis are known, which employ interference effects between various partial beams of rays superimposed on each other for generating displacement-dependent output signals. Lasers, which provide radiation with sufficient coherence properties, are often used as light sources in such position measuring arrangements. The lasers used can be, for example, gas lasers, solid state lasers, but also semiconductor lasers or laser diodes. The former are used in connection with position measuring arrangements embodied as interferometers, the latter in connection with position measuring arrangements which, inter alia, include one or several gratings for generating displacement-dependent output signals. With both laser types a stabilization of the provided wavelength is required, since in case of fluctuations in the respective wavelength erroneous measurements would result in the position determination.

Slow drifting of the provided wavelength results in a change of the measured position, in particular in connection with interferometers, a corresponding effect is less with position measuring arrangements with gratings.

In many measuring situations a slow drift of the respective wavelength plays only a small role, for example when it is necessary to perform only relative measurements in a very short time. However, even with such applications this is critical if rapid changes of the respective wavelength occur. However, exactly this can occur in single-mode lasers of various types, i.e. also with gas, solid state or semiconductor lasers. The reason for this lies in the different dependencies of the amplification profile and the resonator modes on the temperature and other influence quantities. Once the maximum of the amplification profile has been displaced too far from a resonator mode, the wavelength of the laser jumps to the adjoining resonator mode. In actual use, the temperature is substantially decisive for this.

A first possibility for solving this problem regards performing a wavelength stabilization of the respective laser, such as disclosed in U.S. Pat. No. 5,161,165, the entire contents of which are incorporated herein by reference. It is proposed in this publication to specifically suppress the multi-mode operation of a laser diode with the aid of an external etalon. However, this way of proceeding requires a relatively large outlay.

Alternatively, it is known from U.S. Pat. No. 5,198,873, the entire contents of which are incorporated herein by reference, for example, to use in place of a so-called single-mode laser diode a multi-mode laser diode, which has a relatively dense mode spectrum and wherein only insignificant changes in the wavelength result in case of small temperature fluctuations. However, such multi-mode laser diodes do not provide the required radiation output, in particular when the radiation from the light source is to be provided via a fiber-optical waveguide to a scanning head with signal generating means. Such a light source cannot be used in connection with required radiation outputs of 10 mW in the scanning head of the position measuring arrangement.

OBJECT AND SUMMARY OF THE INVENTION

It is therefore an object of the present invention to disclose a position measuring arrangement which has a light source of sufficient power output and which, if possible, does not show any erratic changes in the emitted wavelength even during possible temperature changes.

This object is attained by a position measuring arrangement for determining a relative position between a first object and a second object. The arrangement includes a light source having a single-mode laser light source that generates radiation and a signal generator that receives the radiation and generates displacement-dependent output signals that determine a relative position between a first object and a second object. A feedback device, wherein the laser light source interacts with the feedback device in such a way that an excitation of several modes takes place in the single-mode laser light source, and a multi-mode operation of the single-mode laser light source results.

In accordance with the present invention, a single-mode laser light source of sufficient power output is used as the light source, which acts in a reciprocal manner with a feedback device in such a way that an excitation of several closely adjoining external modes takes place in the single-mode laser light source, from which a quasi multi-mode operation of the single-mode laser light source results. Therefore this will be just called a multi-mode operation in what follows.

A single-mode laser diode, i.e. a semiconductor laser, is used as the single-mode laser light source in the position measuring arrangement of the present invention. However, other laser types, such as gas lasers or solid state lasers, can also be employed as single-mode laser light sources in principle.

An interference with the laser operation results because of the specific feedback of the emitted radiation into the resonator of the single-mode laser light source in such a way, that the single-mode laser light source changes into a multi-mode operation. In this case the resulting mode spectrum is very dense, several adjoining modes are simultaneously occupied. In this case a possible temperature change no longer results in a mode jump with the corresponding undesired consequences, only a temperature-dependent slow change in the occupation of the narrowly distributed modes involved takes place. The effects of a possible temperature change on the output wavelength of the light source are correspondingly reduced. At the same time the single-mode laser light source produces a sufficient light output for feeding the generated radiation to a scanning head via a fiber-optical waveguide, for example.

Regarding the feedback device with which the single-mode laser light source interacts, various embodiment options exist, which can be realized depending on the existing requirements.

The steps in accordance with the present invention can be employed in connection with position measuring arrangements in which one or several gratings are used for the generation of displacement-dependent output signals, and in which a graduation period of a scale grating functions as the measuring standard. Alternatively, the position measuring arrangement in accordance with the invention can also be embodied as an interferometer, in which the wavelength of the radiation generated by the light source is used as the measuring standard.

Further advantages, as well as details of the present invention ensue from the subsequent description of exemplary embodiments by the attached drawings.

DETAILED DESCRIPTION OF THE PREFERRED EMBODIMENTS

Figure 1:
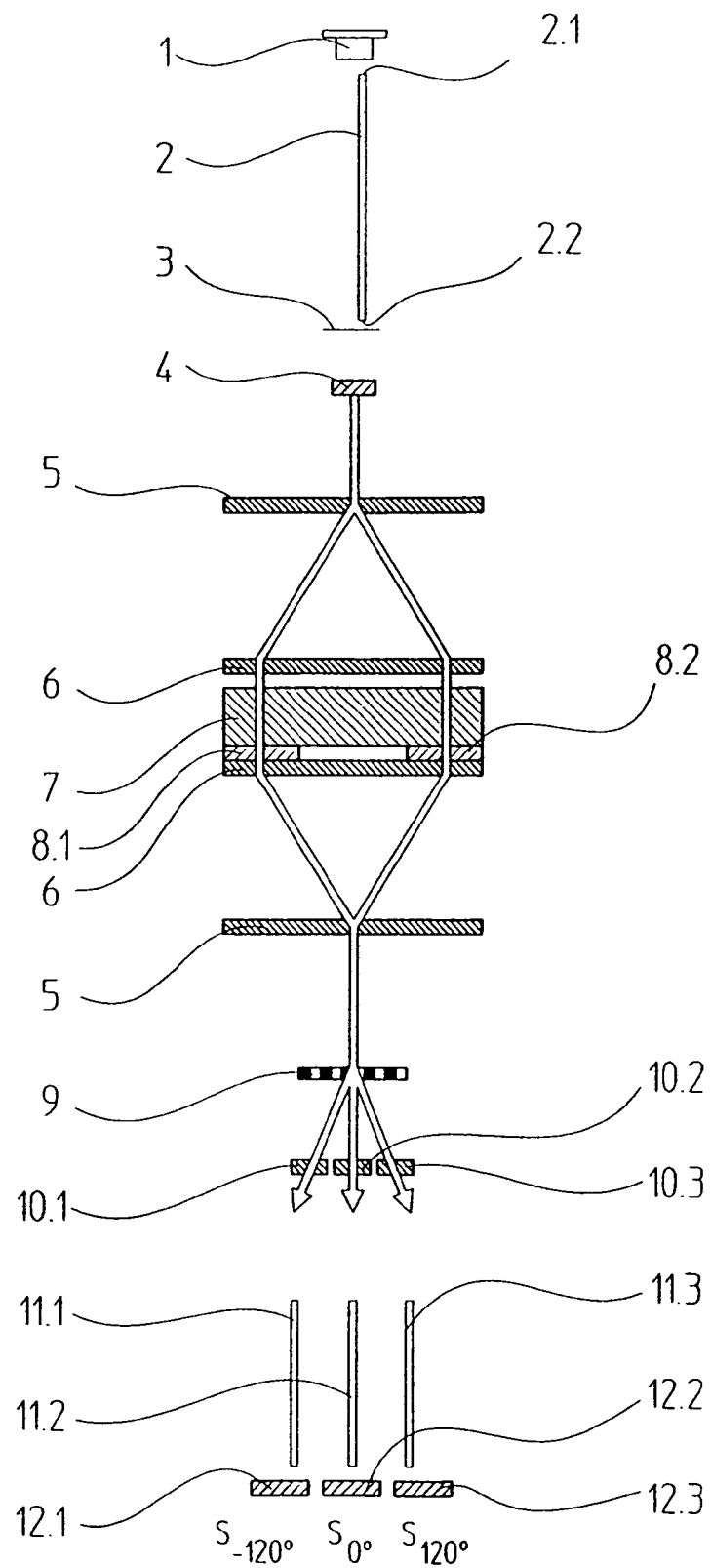
FIG. 1 is a schematic representation of the scanning beam path of a first embodiment of a position measuring arrangement in accordance with the present invention.

The complete unfolded scanning beam path in accordance with an exemplary embodiment of the position measuring arrangement of the present invention is shown in FIG. 1 in a schematic representation. In this exemplary embodiment, this relates to a position measuring arrangement based on the interferential principle, which inter alia employs several gratings for signal generation. The principle of signal generation will be briefly explained in what follows, before the measures in accordance with the present invention in connection with the light source used will be covered in detail.

The position measuring arrangement in accordance with the present invention includes a light source 1 in the form of a single-mode laser light source. In the exemplary embodiment represented, the single-mode laser light source is embodied as a single-mode laser diode, whose emitted radiation is supplied to the succeeding elements via a fiber-optical waveguide 2. These elements will be called signal generators in the course of the further description and are used for generating the displacement-dependent output signals. As already indicated at the start, alternatively to the represented embodiment, the signal generators can also be designed differently, for example as a known interferometer structure, etc.

In the exemplary embodiment in FIG. 1, the radiation fed through the fiber 2 reaches a scale graduation 5 via an optical collimator device 3 and a polarizer 4. A scanning grating 6, arranged on a retro-reflecting element 7 in the form of a ridge prism, is arranged downstream of the scale graduation 5. Moreover, two optical polarization elements 8.1, 8.2, which are designed as small λ/4 plates, are arranged on the ridge prism. On the part of the detector, a further grating 9 and several polarizers 10.1, 10.2, 10.3 are provided, downstream of which fiber-optical waveguides 11.1, 11.2, 11.3 are arranged in turn, to which the displacement-dependent output signals $S_{-120°}$, $S_{0°}$, $S_{120°}$ are applied.

Figure 2:
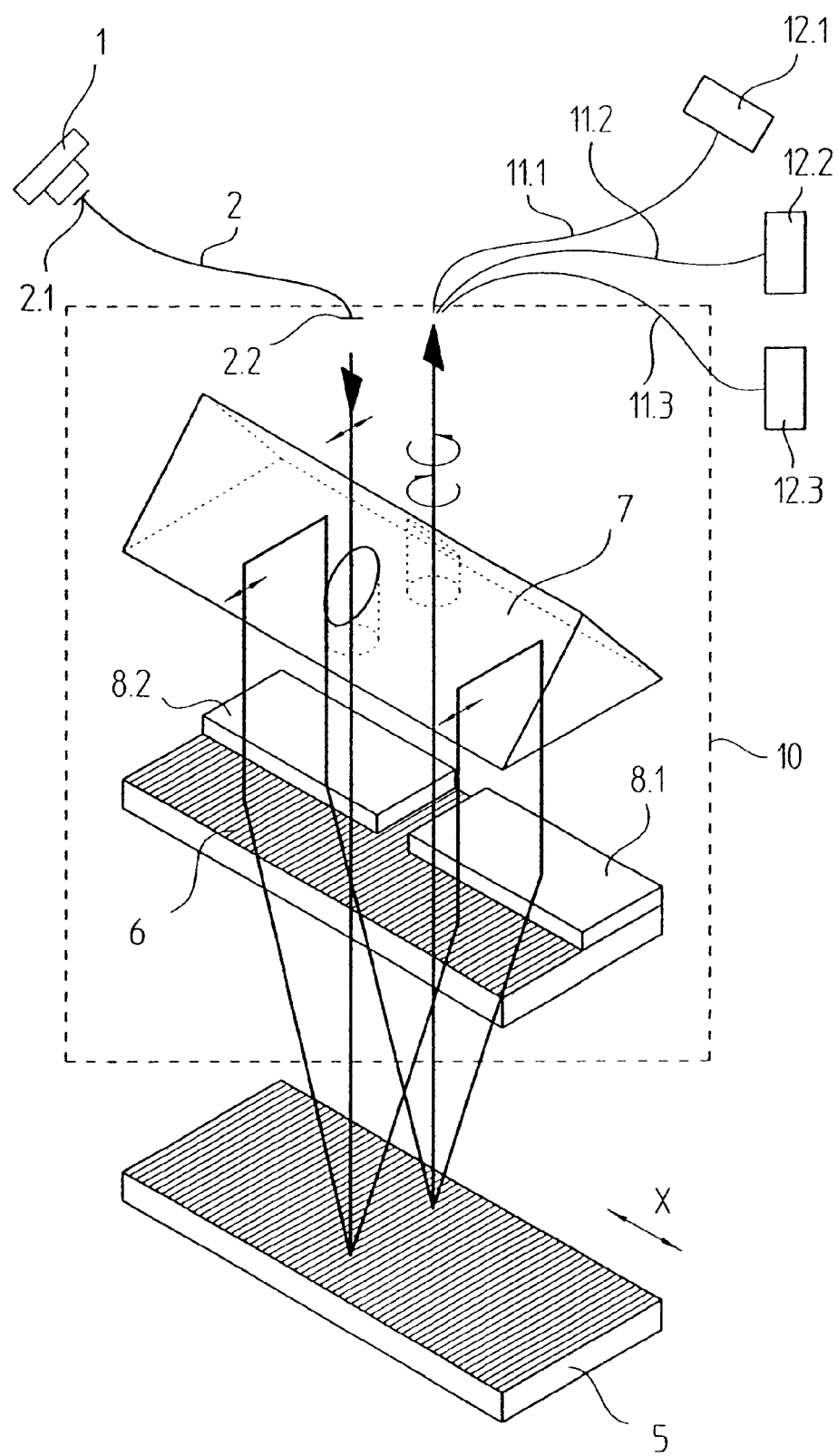
FIG. 2 is a schematic spatial representation of the exemplary embodiment in FIG. 1.

A spatial representation of the position measuring arrangement in FIG. 1 is shown in FIG. 2. The spatial arrangement of the signal generators in particular can be seen in this plan view.

In the concrete embodiment, the radiation of the light source 1 is supplied to the scanning unit 10 via the fiber-optical waveguide 2, i.e. the fiber output face 2.2 is connected with the scanning unit 10, on the input side the light source 1 is arranged in a fixed spatial manner to the input face 2.1. The scanning unit 10 contains a portion of the above described signal generators. Among these are, besides the retro-reflecting element 7, the scanning grating 6 and the two optical polarization elements 8.1, 8.2, or small λ/4 plates.

As can also be seen from FIG. 2, the scanning unit 10 is arranged so that it can be displaced in the direction x in relation to the scale grating 5. Accordingly, the two objects, whose relative positions are to be determined with the aid of the position measuring arrangement in accordance with the present invention, are connected with the scanning unit 10, on the one hand, and the scale grating 5 on the other.

It can furthermore be seen from FIG. 2 that, similar to the light source 1, the detector elements 12.1, 12.2, 12.3 are also arranged spatially distant from the scanning unit 10. Following the resulting reciprocal effect between the scale grating 5 and the scanning grating 6, the radiation to be detected is supplied to the detector elements 12.1, 12.2, 12.3 from the scanning unit 10 via the fiber-optical waveguides 11.1, 11.2, 11.3. In the case of a relative movement between the two objects, or between the scanning unit 10 and the scale grating 5, the displacement-dependent periodic $S_{-120°}$, $S_{0°}$, $S_{120°}$ can be detected by the detector elements 12.1, 12.2, 12.3. The detected output signals $S_{-120°}$, $S_{0°}$, $S_{120°}$ are in turn returned from the detector elements 12.1, 12.2, 12.3 for further processing to a follow-up electronic device, not represented.

Finally, regarding the concrete signal generation in the position measuring arrangement of the invention, reference is also made to WO 02/23131 of Applicant, which corresponds to U.S. patent application Ser. No. 10/380,847, filed on Mar. 14, 2003, the entire contents of which are incorporated herein by reference.

The measures in accordance with the present invention regarding the light source used will now be explained by a first exemplary embodiment represented in FIG. 3. As already mentioned above, a single-mode laser diode of the type DL 7140-201, which can be procured from SANYO Semiconductor Corp, is used as a light source 1 here.

An optical coupling device 1.1 in the form of a suitable lens, or possibly a multi-lens system, is arranged upstream of the light source 1, by which the radiation emitted from the light source 1 is focused on the input face 2.1 of the fiber optical waveguide 2. Following its exit from the output face 2.2, the radiation is conducted by the fiber-optical waveguide 2 to the previously explained signal generators, which are not represented in FIG. 3.

Figure 3:
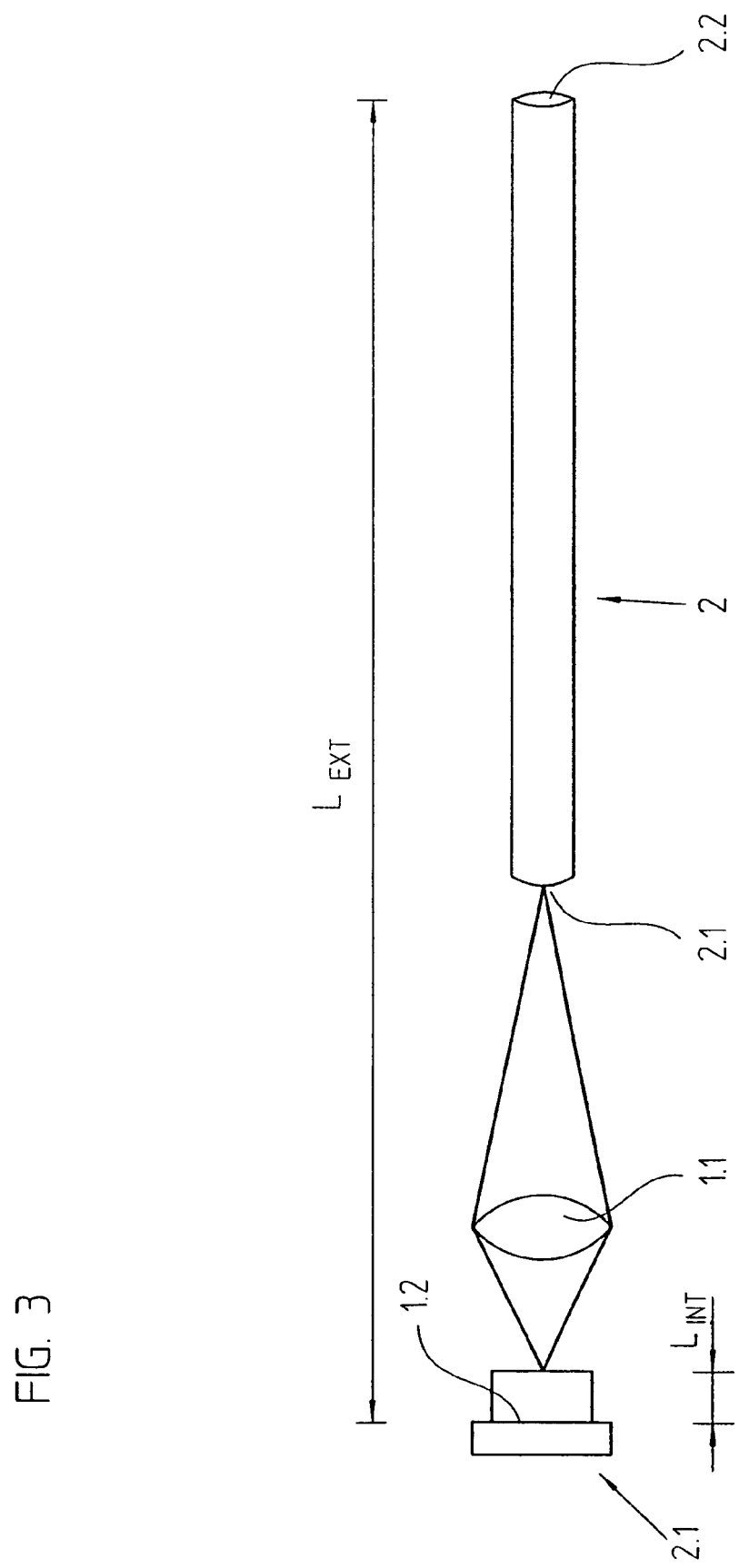
FIG. 3 shows an enlarged portion of the representation in FIG. 1 with an embodiment of a single-mode laser light source embodied as a single-mode laser diode, an embodiment of an upstream-connected fiber-optical waveguide, as well as an embodiment of a feedback device in accordance with the present invention.

In the example of FIG. 3, as well as in alternative embodiment variations, a feedback device which are complementarily provided are used to operate the single-mode laser light source or, in the present example the single-mode laser diode, in multi-mode operation, which offers advantages regarding the temperature dependence of the emitted radiation wavelength λ. An external resonator is formed via the feedback device, whose resonator length $L_{EXT}$ is selected in a definite way to be such that no longer only a single mode, as predetermined by the clearly shorter internal resonator length $L_{INT}$ of the laser diode, is exited, but a simultaneous excitation of several modes results, which fluctuate statistically, but are always simultaneously excited. In this way a quasi multi-mode operation of the essentially single-mode laser diode results, in which, besides the good stability regarding temperature-induced wavelength fluctuations, a sufficient radiation output is assured. No mode jumps in particular occur in case of temperature fluctuations, which cannot be prevented, and therefore no jumps of the emitted radiation wavelength λ. In contrast thereto, only minor changes of the emitted radiation wavelength λ result because of the temperature-induced slow and continuous change in occupation of all involved, closely distributed modes.

Figure 4A:
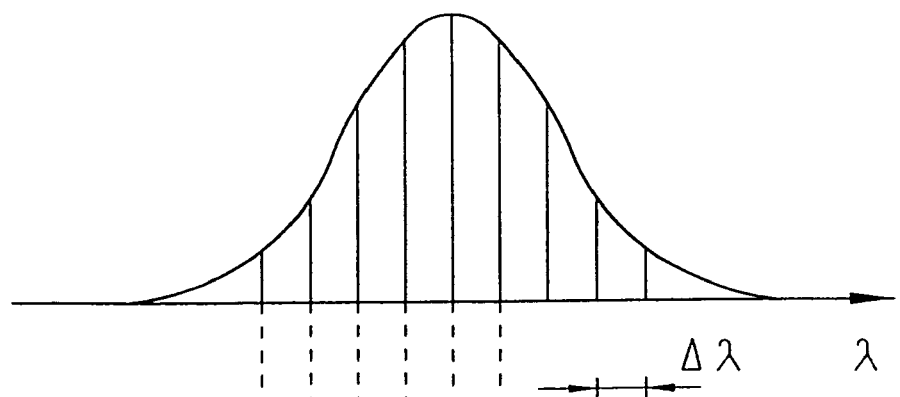
FIGS. 4a, 4b respectively are schematic representations of a possible resulting mode spectrum of a single-mode laser diode in FIG. 1, which is operated in accordance with the present invention, prior to and after a possible temperature change.

The mode spectrum prior to a temperature change of a single-mode laser diode operated in accordance with the present invention is represented in a schematic form in FIG. 4a. The narrow distribution of the resulting modes, which now, because of the clearly increased external resonator length $L_{EXT} \approx 1$ to 10 m, only have a mutual wavelength distance $\Delta\lambda \approx 2*10^{-4}$, is clearly discernible. But without the steps in accordance with the present invention, because of the clearly reduced internal resonator length $L_{INT} \approx 1$ to 2 mm of the single-mode laser diode, the mutual wavelength distance Δλ of adjoining modes approximately lies at Δ?≈0.2 nm to 0.3 nm.

Figure 4B:
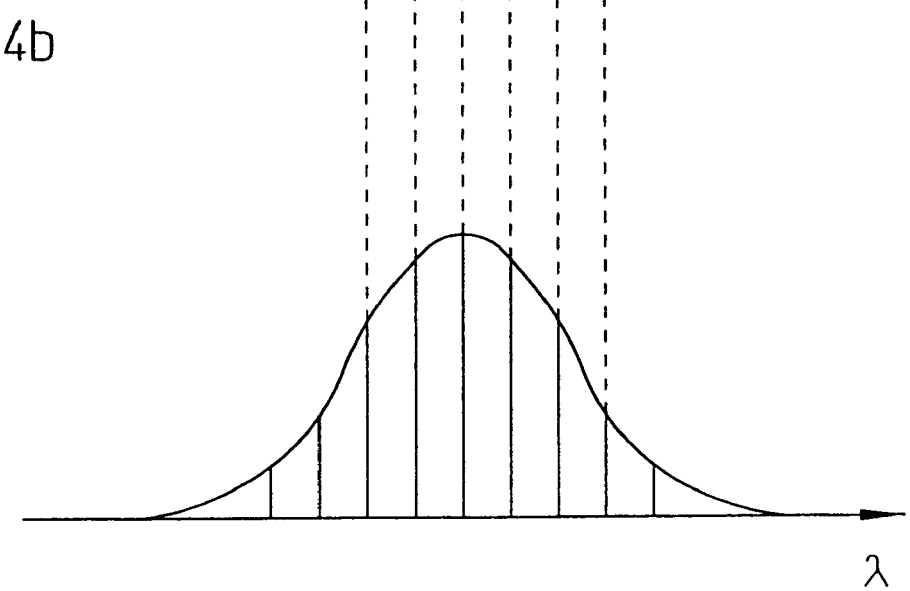

The mode spectrum resulting after a possible temperature change is illustrated in FIG. 4b. The change in occupation of the different modes within the amplification profile following a temperature change is shown by the dashed connecting lines between the individual modes in FIGS. 4a and 4b.

Various execution options are available for embodying an external resonator, or for embodying suitable feedback device, by which this can be achieved. In the example represented in FIG. 3, a partially reflecting reflection element constituted by the fiber output face 2.2 is provided as a feedback device outside the single-mode laser diode. In this variation, the external resonator therefore includes, on the one hand, the fiber output face 2.2, which reflects a portion of the emitted radiation back into the single-mode laser diode. On the other hand, the external resonator includes a reflector face 1.2 within the single-mode laser diode. The narrow wavelength distance Δλ of the excited adjoining modes is predetermined by the resonator length $L_{EXT}$, as explained above.

In this example, the fiber output face 2.2 reflects a defined portion of the impinging radiation intensity back into the single-mode laser diode. Without further steps, the intensity reflected back is approximately 4% of the radiation output. This is sufficient for operating the single-mode laser diode in accordance with the present invention, possibly even lesser reflected radiation intensities are already sufficient. Depending on the requirements, however, it is possible to reflect a larger proportion of the radiation intensity back. For achieving these back-reflecting properties of the fiber output face 2.2, it is also possible for it to be additionally metal-coated or reflecting. Alternatively to this, a partial reflection-reducing layer can be provided for the latter, etc. Accordingly, there exist various options, known to one skilled in the art, as to how the back-reflecting properties of the fiber output face 2.2 can be realized for designing the external resonator.

In the case of an embodiment in accordance with FIG. 3, it has furthermore been shown to be advantageous if the surfaces of the optical coupling device 1.1 have an anti-reflecting coating. It is assured by this that no significant radiation portions are already reflected back into the resonator of the single-mode laser diode. As discussed above, the desired narrow mutual wavelength distance Δλ of adjoining modes is the lesser, the longer the external resonator length $L_{EXT}$ is selected to be.

Alternatively to the variation in FIG. 3, the fiber input face 2.1 of the fiber-optical waveguide 2 used can function as an at least partially reflecting reflector element, or a feedback device. In this case the fiber output face 2.2 would then have to be embodied to be completely anti-reflective, while the optical fiber input face 2.1 reflects at least a portion of the radiation back again in the direction of the single-mode laser diode. Then the external resonator would be constituted by the fiber input face 2.1 and the internal reflector face 1.2 of the single-mode laser diode. In comparison with the previous example, an external resonator length $L_{EXT}$ would result, which would then be correspondingly reduced by the length of the fiber-optical waveguide 2.

Still further possibilities for designing the feedback device, and therefore for embodying an external resonator, by which the multi-mode operation of the single-mode laser light source or, in the present example of the single-mode laser diode, can be realized, will be explained in what follows by FIGS. 5a to 5e.

Figure 5A:
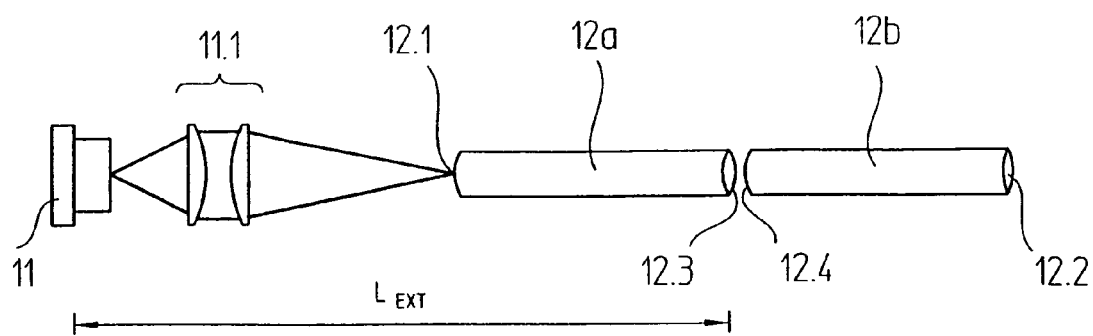
FIGS. 5a to 5e are each representations of alternative embodiments of a feedback device to be used with the position measuring arrangement of FIGS. 1 and 3 in accordance with the present invention.

In the variation in accordance with FIG. 5a, a fiber-optical waveguide composed of two fiber sections 12a, 12b, is arranged downstream of the light source 11 and the optical input face 11.1. The end faces 12.3, 12.4 of the two fiber sections 12a, 12b are in contact with each other by a suitable plug connection, not represented. However, one of the two end faces 12.3 or 12.4 is partially metallized and therefore functions as an external, partially-reflecting reflection element for constituting the external resonator of the resonator length $L_{EXT}$. The remaining flat surfaces, such as at the side of the dual-lens optical input device 11.1, or the fiber input face 12.1 and the fiber output face 12.2, have been coated with a non-reflective material.

Figure 5B:
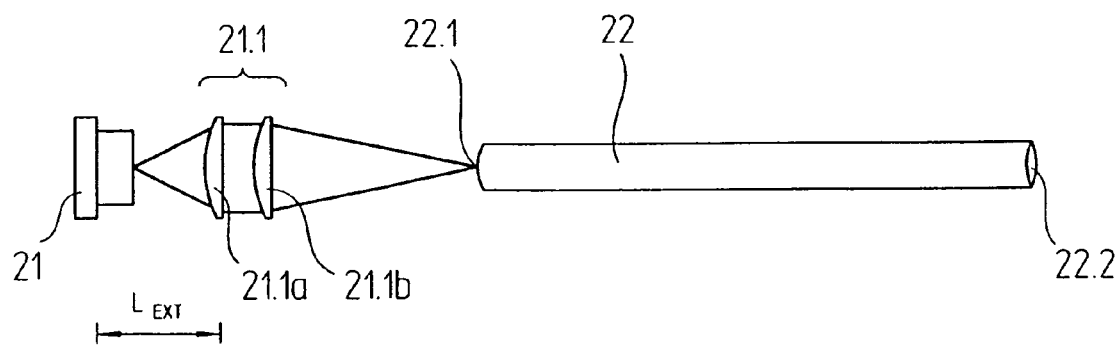

Another possibility for embodying the feedback device is schematically represented in FIG. 5b. Here, a flat surface 21.1a of the dual-lens optical input device 21.2 is used as the partially-reflecting reflector element. For this purpose it is sufficient not to coat this flat surface 21.1a in an anti-reflecting manner. The result is a back-reflection into the light source 21 embodied as a single-mode laser diode, so that an external resonator of the length $L_{EXT}$ is formed. No other steps in connection with the downstream-arranged fiber-optical wave guide 22 are required.

Figure 5C:
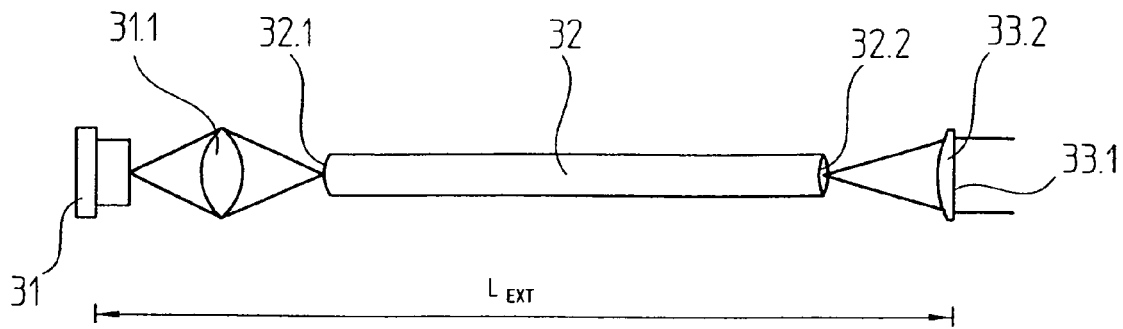

In accordance with the embodiment in FIG. 5c, an optical input device 31.1, which is coated to be anti-reflective, and a fiber-optical wave guide 32 are arranged downstream of the light source 31 in the form of a single-mode laser diode. A further lens 33 for shaping the beam of the radiation which is output by the output face 32.2 is arranged adjoining the output face 32.2 of the fiber-optical waveguide 32. The lens 33 has a flat face 33.1, which functions as a partially reflecting reflector element and causes a partial back-reflection of the impinging radiation into the resonator of the single-mode laser diode, so that in this way again the embodiment of an external resonator of the resonator length $L_{EXT}$ results. It is sufficient for this purpose to lay out the flat face 33.1 of the lens 33 not to be anti-reflecting.

Figure 5D:
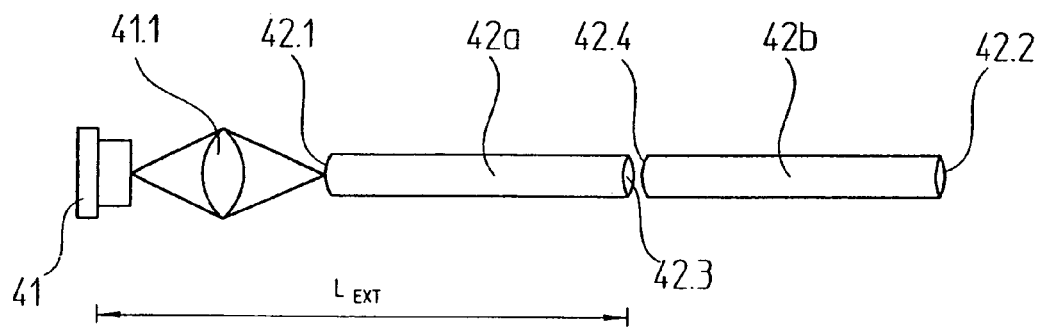

A further embodiment possibility of the feedback device in the form of a partially reflecting reflector element is illustrated in FIG. 5d. A dual, or possibly multi-fiber optical waveguide including two, or possibly more fiber sections 42a, 42b, is arranged downstream of the light source 41 and the optical input device 41.1. In contrast to the variation in accordance with FIG. 5a, the oppositely located end faces 42.3, 42.4 of the fiber sections 42a, 42b are now no longer in direct contact with each other via a plug connection. Instead, an air gap is provided between the end faces, so that a partial back reflection of the impinging radiation into the resonator takes place at the first end face 42.3. The resulting external resonator length $L_{EXT}$ is also illustrated in FIG. 5d.

Figure 5E:
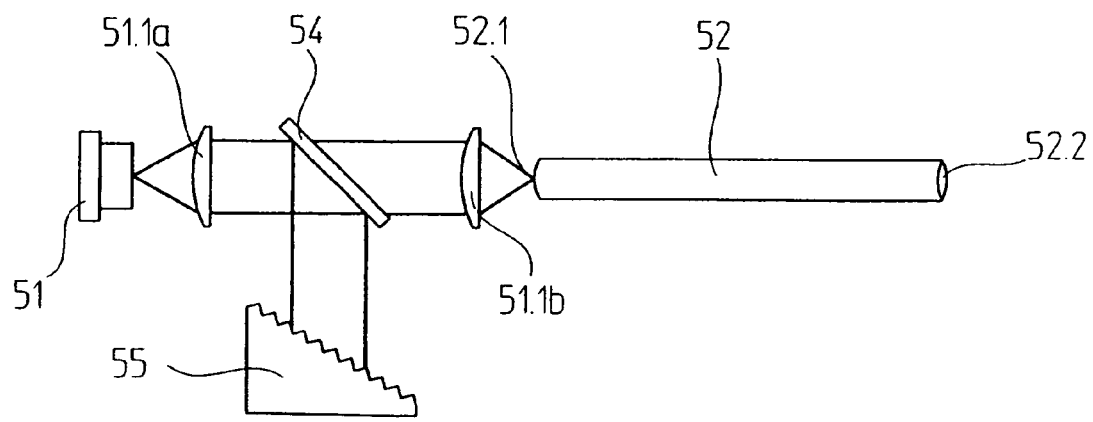

In the variation in accordance with FIG. 5e it is provided to arrange a beam splitter 54 between the light source 51 and the optical input device 52.1, which removes a portion of the impinging radiation intensity and deflects it in the direction toward a reflection grating 55. A back reflection of the impinging radiation in the direction of the resonator takes place at the reflection grating 55.

In a further variation, not represented, for embodying the feedback device it is possible to arrange a partially reflecting mirror outside the resonator of the single-mode laser diode and to feed back a part of the impinging radiation in this way.

Besides the explained variation, still further possibilities for embodying the feedback device of course exist within the scope of the present invention.

Further exemplary embodiments exist within the scope of the present invention besides the described examples.

We claim:

1. A position measuring arrangement for determining a relative position between a first object and a second object, comprising:
   a light source comprising a single-mode laser light source that generates radiation;
   a signal generator that receives said radiation and generates displacement-dependent output signals that determine a relative position between a first object and a second object; and
   a feedback device, wherein said laser light source interacts with said feedback device in such a way that an excitation of several modes takes place in said single-mode laser light source, and a multi-mode operation of said single-mode laser light source results.

2. The position measuring arrangement in accordance with claim 1, further comprising:
   a fiber-optical waveguide arranged upstream of said light source, wherein said fiber-optical waveguide comprises:
   an input face of said fiber-optical waveguide that receives said radiation from said light source; and
   an output face that emits said radiation received by said input face and supplies said emitted radiation to said signal generator.

3. The position measuring arrangement in accordance with claim 1, wherein said feedback device comprises:
   a partially reflecting reflector element on which at least a portion of said radiation from said single-mode laser light source impinges, and from which a back-reflection of said radiation into said single mode laser light source results.

4. The position measuring arrangement in accordance with claim 2, wherein said input face comprises a partially reflecting reflection element.

5. The position measuring arrangement in accordance with claim 2, wherein said output face comprises a partially reflecting reflection element.

6. The position measuring arrangement in accordance with claim 2, further comprising:
   a first fiber section with a first end face that comprises a partially-reflecting reflection element;
   a second fiber section with a second end face that faces said first end face;
   wherein said first and second fiber sections feed said radiation from said light source to said signal generator.

7. The position measuring arrangement in accordance with claim 6, wherein said first and second end faces are in contact with each other by an optical plug connection.

8. The position measuring arrangement in accordance with claim 6, wherein an air gap is located between said first and second end faces.

9. The position measuring arrangement in accordance with claim 2, further comprising an optical input device arranged upstream of said input face of said fiber-optical waveguide, which has at least one surface which functions as a partially-reflecting reflection element.

10. The position measuring arrangement in accordance with claim 2, further comprising an optical output device arranged downstream of said output face of said fiber-optical waveguide, which has at least one face functioning as a partially reflecting reflection element.

11. The position measuring arrangement in accordance with claim 3, further comprising a beam splitter element arranged downstream of said light source, which outputs a portion of radiation intensity from said light source and deflects it on a reflection grating, from where a back reflection of radiation into said single-mode laser light source results.

12. The position measuring arrangement in accordance with claim 3, wherein a partially permeable mirror is used as said partially reflective element arranged outside of said single-mode laser light source.

13. The position measuring arrangement in accordance with claim 1, wherein said single-mode laser light source comprises a single-mode laser diode.

14. The position measuring arrangement in accordance with claim 1, wherein said signal generator comprises:
   a scanning grating;
   a scale grating; and
   an optoelectronic detector element.

15. The position measuring arrangement in accordance with claim 14, wherein said scanning grating and said optoelectronic detector element are arranged in a scanning unit connected with said first object, while said scale grating is connected with said second object.

16. The position measuring arrangement in accordance with claim 15, wherein said output face is connected with said scanning unit and conveys said radiation from said light source to said scanning unit.

17. The position measuring arrangement in accordance with claim 16, wherein, following reciprocal action between said scanning grating and said scale grating, radiation output at said output face impinges on said optoelectronic detector element and, in case of a relative movement between said first and second objects, said displacement-dependent output signal is detected by said detector element.

* * * * *